(12) United States Patent
Anicet

(10) Patent No.: US 12,551,735 B2
(45) Date of Patent: Feb. 17, 2026

(54) PARACHUTE DEVICE FOR HIGH-RISE EMERGENCY EVACUATIONS

(71) Applicant: Jean Anicet, Elmont, NY (US)

(72) Inventor: Jean Anicet, Elmont, NY (US)

(*) Notice: Subject to any disclaimer, the term of this patent is extended or adjusted under 35 U.S.C. 154(b) by 0 days.

(21) Appl. No.: 18/779,627

(22) Filed: Jul. 22, 2024

(65) Prior Publication Data
US 2025/0114648 A1 Apr. 10, 2025

Related U.S. Application Data

(60) Provisional application No. 63/588,078, filed on Oct. 5, 2023.

(51) Int. Cl.
*A62B 3/00* (2006.01)
*B64D 17/30* (2006.01)
*B64D 17/64* (2006.01)

(52) U.S. Cl.
CPC ............... *A62B 3/00* (2013.01); *B64D 17/30* (2013.01); *B64D 17/64* (2013.01)

(58) Field of Classification Search
CPC ...................................................... B64D 17/64
See application file for complete search history.

(56) References Cited

U.S. PATENT DOCUMENTS

| | | | | |
|---|---|---|---|---|
| 5,544,846 A | * | 8/1996 | Stroud | B64D 17/64 244/148 |
| 8,091,151 B2 | * | 1/2012 | Johnson | A41D 13/0007 2/455 |
| 9,656,758 B2 | * | 5/2017 | Reinpold | B64D 17/40 |
| 2008/0173764 A1 | * | 7/2008 | Oh | B64D 17/40 244/143 |
| 2011/0168846 A1 | * | 7/2011 | Strong | B64D 17/50 244/148 |

* cited by examiner

*Primary Examiner* — Justin M Benedik
(74) *Attorney, Agent, or Firm* — Brennan, Manna & Diamond, LLC

(57) ABSTRACT

A fire escape parachute device designed for safe and effective evacuation from high-rise buildings (i.e., fixed bases) during emergencies, such as fires, is disclosed. The device comprises a canopy made from lightweight, durable, and tear-resistant fabric, reinforced with multi-strand Kevlar threads. A harness, featuring adjustable shoulder, thigh, and waist/chest straps, connects to the canopy via suspension lines and includes a front buckle for secure fastening. The device incorporates a deployment handle for manual parachute release, and in one embodiment, an automatic deployment system ensures canopy deployment if the user is not able to pull the handle. In other embodiments, the parachute includes sensors to monitor altitude and adjust the canopy to control descent speed.

15 Claims, 4 Drawing Sheets

PARACHUTE DEVICE FOR HIGH-RISE EMERGENCY EVACUATIONS

CROSS-REFERENCE TO RELATED APPLICATION

The present application claims priority to, and the benefit of, U.S. Provisional Application No. 63/588,078, which was filed on Oct. 5, 2023, and is incorporated herein by reference in its entirety.

FIELD OF THE INVENTION

The present invention generally relates to the field of emergency evacuation devices. More specifically, the present invention relates to a novel fire escape parachute device designed to provide a safe and effective means of escaping from high-rise buildings during emergencies, such as fires. The parachute device comprises a canopy reinforced with multi-strand Kevlar threads for enhanced durability and fire resistance. A harness is used for securing the parachute device to a user's body and the parachute provides a safe and controlled descent. Accordingly, the present disclosure makes specific reference thereto. Nonetheless, it is to be appreciated that aspects of the present invention are also equally applicable to other like applications, devices, and methods of manufacture.

BACKGROUND

By way of background, fires in high-rise buildings spread vertically at a very rapid rate, facilitated by the building's design and construction materials. The fire can quickly cut off traditional escape routes for individuals. When a fire occurs on a floor below, residents above may find themselves with no viable means of evacuating the building.

Elevators, which are commonly used for daily transportation within high-rise structures, are typically among the first systems to fail during a fire or any other emergency. As a result, individuals need to access stairwells as the primary escape routes. However, stairwells can also become impassable due to smoke, heat, and debris, further complicating evacuation efforts. The presence of thick, toxic smoke and gases reduces visibility and makes it difficult to breathe. Some individuals may jump from windows and injuries and death may result due to the jumping from high rise buildings. Many individuals are not trained in effective evacuation and traditional evacuation methods are not effective.

Therefore, there exists a long-felt need in the art for a device that provides a safe and effective means of escaping from high-rise buildings during emergencies, such as fires. There is also a long-felt need in the art for a fire escape device that can be easily deployed and used by individuals without extensive training. Additionally, there is a long-felt need in the art for a parachute device that can be stored compactly and accessed quickly in emergency situations. Moreover, there is a long-felt need in the art for an escape device that ensures a controlled and safe descent, minimizing the risk of injury. Further, there is a long-felt need in the art for a system that enables individuals to bypass blocked or hazardous escape routes and descend to safety using a controlled and reliable parachute system. Furthermore, there is a long-felt need in the art for a fire escape device that can accommodate users of different sizes and provide comfort during descent. Finally, there is a long-felt need in the art for a fire escape parachute device that integrates modern materials and technology to provide a reliable and efficient solution for high-rise building evacuations.

The subject matter disclosed and claimed herein, in one embodiment thereof, comprises a parachute device for evacuating high-rise buildings during emergencies. The parachute device includes a canopy, a plurality of multi-strand Kevlar threads for reinforcing the canopy, a harness adapted to be worn by a user, the harness includes a plurality of straps, each strap having an adjuster for adjusting the length, a plurality of suspension lines connecting the harness to the canopy, a deployment handle, a buckle for strapping and securing the harness around the body of the user, at least one sensor configured to monitor the user's altitude, and a speed sensor configured to adjust the canopy based on the altitude detected by the sensor to control the speed of descent.

In this manner, the fire escape parachute device of the present invention accomplishes all of the foregoing objectives and provides users with a novel parachute device that addresses the critical need for a safe and effective means of escaping from high-rise buildings during emergencies. The device solves the problem of rapid fire spread and blocked escape routes by providing an alternative evacuation method that bypasses traditional exits. The canopy, made from lightweight, durable, and tear-resistant fabric reinforced with multi-strand Kevlar threads, opens quickly and efficiently to ensure a controlled descent, mitigating the risk of injury. The harness includes adjustable shoulder, thigh, and waist/chest straps with fire-resistant padding for user comfort and features an ergonomic, brightly colored deployment handle for easy and quick activation of the parachute.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a fire escape parachute device. The device comprises a canopy made from a lightweight, durable, tear-resistant fabric, a plurality of multi-strand Kevlar threads reinforce the canopy, a harness is adapted to be worn by a user, the harness includes a pair of shoulder straps, a pair of thigh straps, and a chest support member, each strap has an adjuster for adjusting the length thereof, a plurality of suspension lines connect the harness to the canopy, and a deployment handle is configured to initiate the opening of the canopy.

In yet another embodiment, a parachute device for escaping from high-rise buildings during emergencies is disclosed. The parachute device includes a canopy, a plurality of multi-strand Kevlar threads for reinforcing the canopy, a harness adapted to be worn by a user, the harness including a pair of shoulder straps, a pair of thigh straps, and a waist/chest support member, each strap having an adjuster for adjusting the length, a plurality of suspension lines connecting the harness to the canopy, a deployment handle, a buckle for strapping and securing the harness around the body of the user, at least one sensor configured to monitor the user's altitude, and a speed sensor configured to adjust the canopy based on the altitude detected by the sensor to control the speed of descent.

In another embodiment, a method of using a fire escape parachute device for escaping from high-rise buildings during emergencies is described. The method includes donning a harness and securing it snugly around the user's body using a buckle, jumping from the building while holding onto a parachute deployment handle, pulling the deployment handle during the fall to deploy the parachute, wherein the canopy opens and creates air resistance, descending at a controlled and safe rate guided by the open parachute, and landing safely on the ground.

In another aspect, the fabric of the canopy is ripstop nylon that is waterproof and fire-resistant.

In yet another aspect, the harness further includes padding made from fire-resistant foam or gel covered with Nomex fabric for enhanced comfort.

In still another aspect, an automatic deployment system is included in the parachute device and is configured to deploy the canopy if the user is unable to pull the deployment handle.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
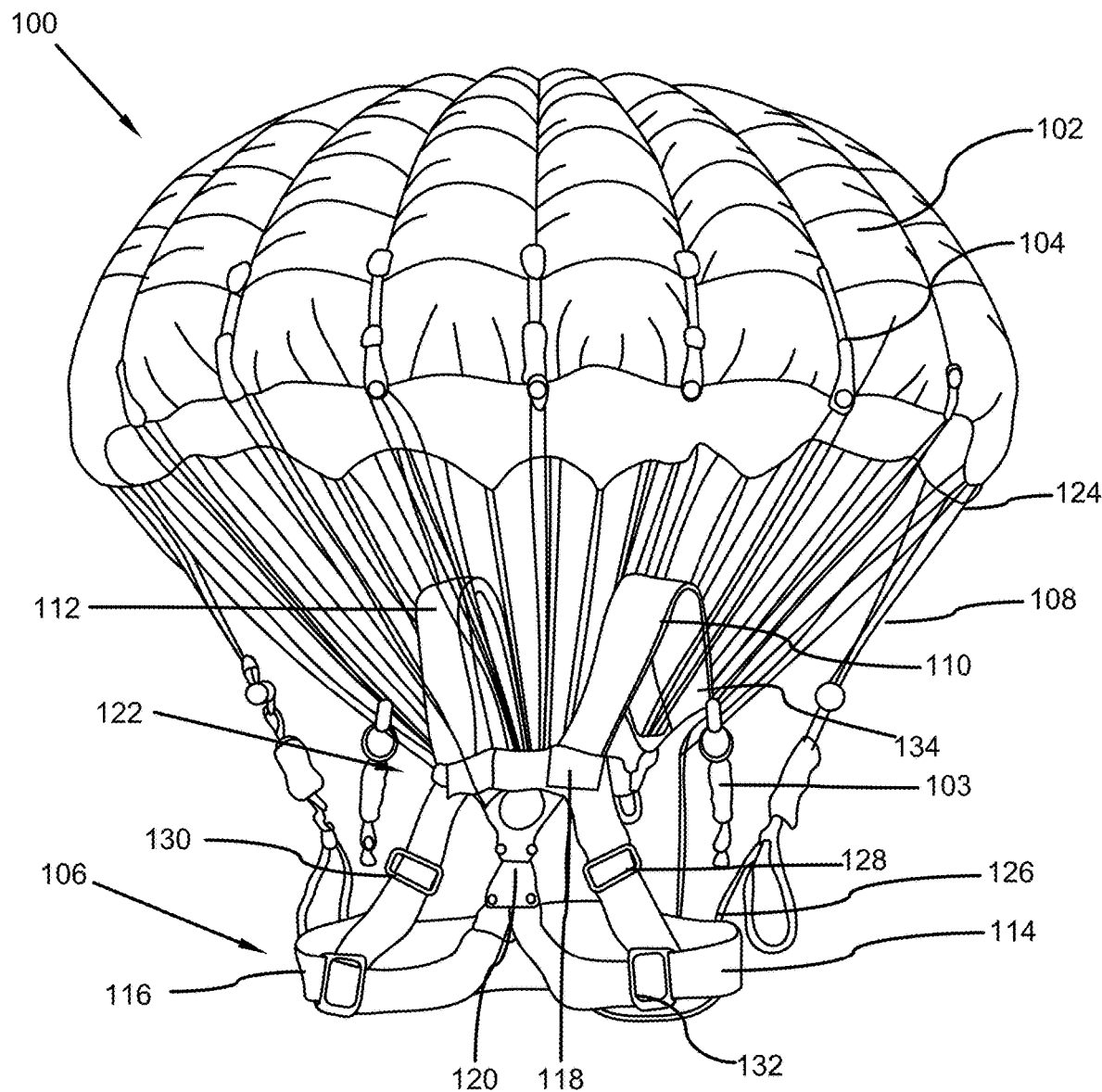
FIG. 1 illustrates a perspective view of fire escape parachute device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a device that provides a safe and effective means of escaping from high-rise buildings during emergencies, such as fires. There is also a long-felt need in the art for a fire escape device that can be easily deployed and used by individuals without extensive training. Additionally, there is a long-felt need in the art for a parachute device that can be stored compactly and accessed quickly in emergency situations. Moreover, there is a long-felt need in the art for an escape device that ensures a controlled and safe descent, minimizing the risk of injury. Further, there is a long-felt need in the art for a system that enables individuals to bypass blocked or hazardous escape routes and descend to safety using a controlled and reliable parachute system. Furthermore, there is a long-felt need in the art for a fire escape device that can accommodate users of different sizes and provide comfort during descent. Finally, there is a long-felt need in the art for a fire escape parachute device that integrates modern materials and technology to provide a reliable and efficient solution for high-rise building evacuations.

The present invention, in one exemplary embodiment, is a method of using a fire escape parachute device for escaping from high-rise buildings during emergencies. The method includes donning a harness and securing it snugly around the user's body using a buckle, jumping from the building while holding onto a parachute deployment handle, pulling the deployment handle during the fall to deploy the parachute, wherein the canopy opens and creates air resistance, descending at a controlled and safe rate guided by the open parachute, and landing safely on the ground.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of fire escape parachute device of the present invention in accordance with the disclosed structure. The fire escape parachute device 100 of the present invention is designed to provide a safe and effective means of escaping from high-rise buildings during emergencies such as fires. More specifically, the fire escape parachute device 100 includes a canopy 102 which forms the main part of the parachute device 100. The canopy 102 is made from a lightweight and durable fabric which is also tear-resistant. Preferably, the canopy 102 is made from ripstop nylon or any other similar waterproof and fire-resistant material.

The canopy 102 is further reinforced with a plurality of multi-strand Kevlar threads or shroud lines 104. The threads or shroud lines 104 have high tensile strength and provide additional durability and resistance to the canopy 102 to extreme conditions. The canopy 102 is designed to open quickly and efficiently to ensure a controlled and safe descent of a user from a high-rise building. Preferably, the device 100 may include a deployment handle 103 that a user pulls to initiate the opening of the parachute for descent. The canopy 102 when deployed comprises a diameter from about 6 feet to about 18 feet. In another embodiment the canopy includes a deployed diameter from about 9 feet to about 15 feet. The diameter of the canopy enables a rapid opening and full deployment of the parachute device 100.

The parachute device 100 includes a harness 106 which is adapted to be worn by a user for using the parachute device 100. The harness 106 is secured to the canopy 102 using a plurality of suspension lines 108. The harness 106 includes a pair of shoulder straps 110, 112, a pair of thigh straps 114, 116 and a waist/chest support member 118. The harness 106 includes a buckle 120, preferably disposed at the front 122 of the harness 106. The buckle 120 is used for strapping and securing the harness 106 around the body of a user as described later in the disclosure. The harness 106 is designed to distribute the forces experienced during the descent evenly across the body, thereby reducing the risk of injury to the user using the parachute device 100.

The top end 124 of each suspension line 108 is preferably connected to a multi-strand Kevlar thread 104 and the bottom end 126 of the suspension line 108 is detachably fastened to the harness 106. It will be apparent to a person skilled in the art that to evenly distribute the forces experienced on a user's body, the suspension lines 108 are connected to harness 106 at various points on different straps 110, 112, 114, 116, 118.

Each strap of the harness 106 includes adjusters shown exemplary through numerals 128, 130, 132 for adjusting length of the harness 106 to fit users of different sizes. The harness 106 can be made of one or more of Kevlar, Nylon, Polyester, High-density polyethylene (HDPE) and can include padding 134 which can be fire-resistant foam or gel padding covered with Nomex fabric for comfort. All the buckles and adjusters used in the harness 106 are made from high-strength, fire-resistant metals, or advanced polymers for secure fastening. The parachute device 100 is adapted to be stored in a compact, lightweight, and easily accessible case located near windows, balconies, or emergency exits when not required to be used.

Figure 2:
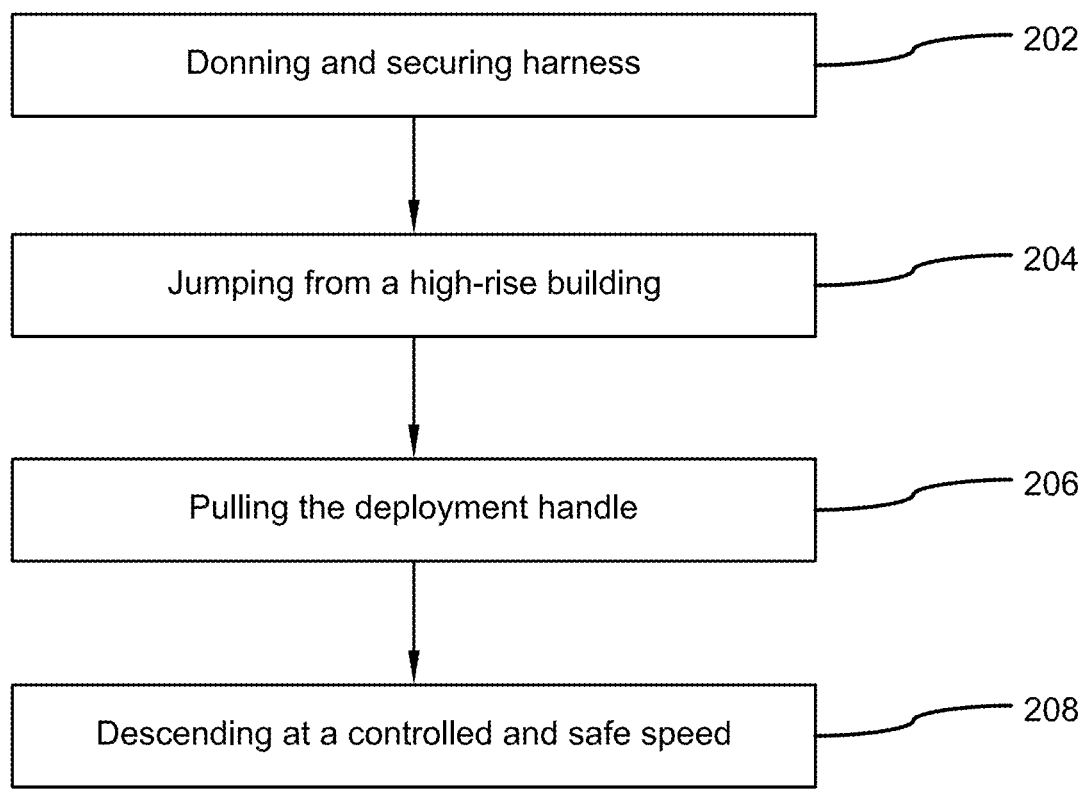
FIG. 2 illustrates a flow diagram depicting a process of use of the advanced fire-resistant parachute system of the present invention for safe evacuation in accordance one embodiment of the disclosure.

FIG. 2 illustrates a flow diagram depicting a process of use of the advanced fire-resistant parachute system of the present invention for safe evacuation in accordance one embodiment of the disclosure. Initially, a user dons the harness 106 and secures snugly around their body using the buckle 120 (Step 202) and moves to a safe jumping point such as a window or balcony. Then, the user jumps from the building (i.e., fixed base) while holding onto the parachute deployment handle 103 (Step 204). Thereafter, as the user falls, the deployment handle 103 is pulled and the parachute automatically deploys, opening the canopy and creating air resistance (Step 206). The user descends at a controlled and safe rate, guided by the open parachute enabling the user to reach the ground safely (Step 208).

Figure 3:
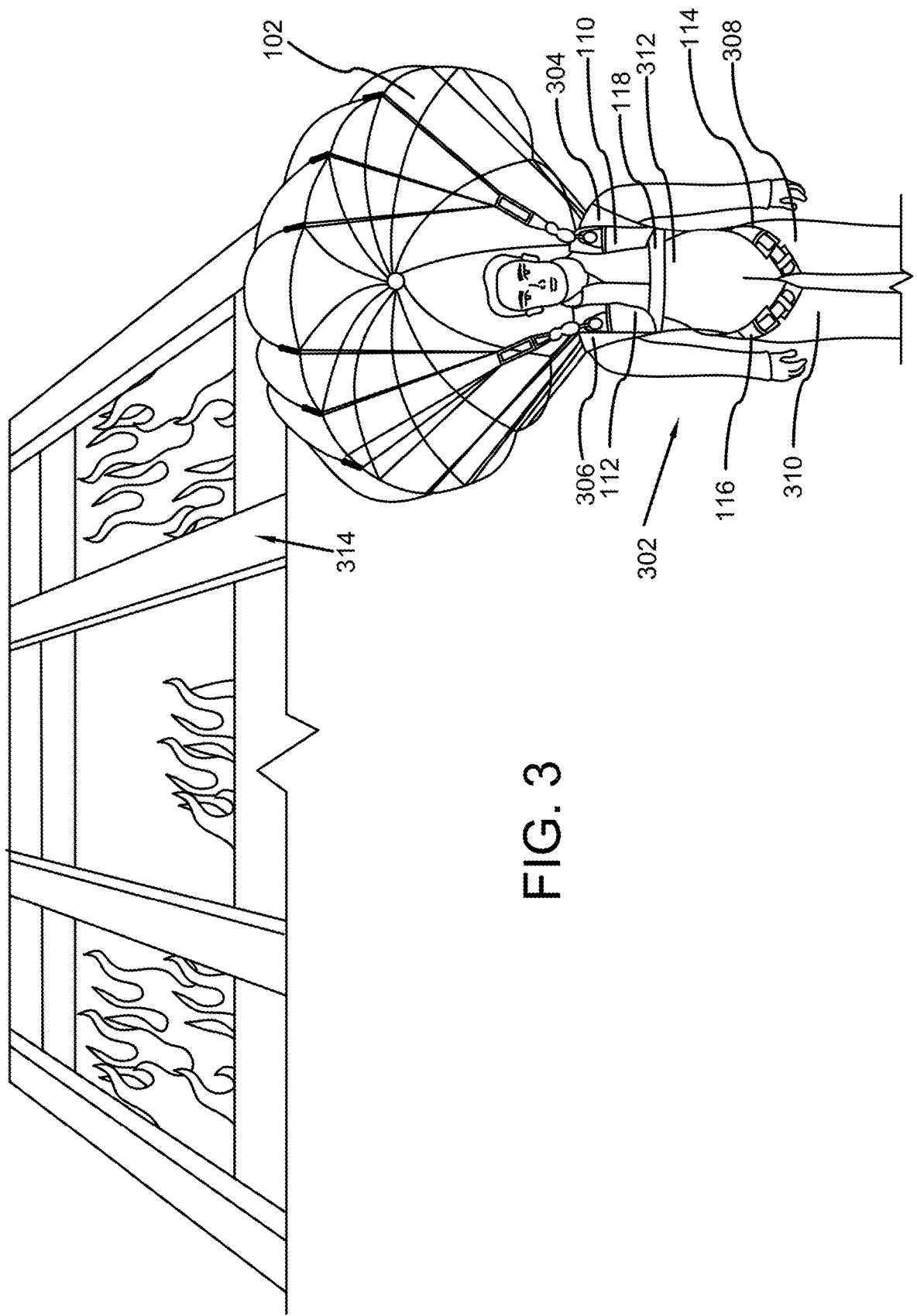
FIG. 3 illustrates a perspective view showing a user wearing the parachute device and descending from a burning building in accordance with the disclosed structure.

FIG. 3 illustrates a perspective view showing a user wearing the parachute device and descending from a burning building in accordance with the disclosed structure. As illustrated, a user 302 dons the harness 106 with the shoulder straps 110, 112 secured around the shoulders 304, 306 of the user 302, thigh straps 114, 116 secured around thighs 308, 310 and the support member 118 secured around chest 312 of the user. When the user 302 jumps from the burning building 314, the canopy 102 fully opens, catches the air, and slows the descent of the user 302. The suspension lines 108 and harness 106 work together to keep the user 302 stable and upright during the descent. After landing, the user can quickly remove the harness and move to a safe location away from the building.

In some embodiments of the present invention, the advanced fire-resistant parachute system for safe evacuation 100 can include additional emergency items such as a small first aid kit, flashlight, or emergency whistle. In one embodiment, the parachute device 100 may deploy the canopy 102 automatically if the user is unable to pull the handle. This is particularly useful in high-stress situations or if the user loses consciousness. The deployment handle 103 is brightly colored and ergonomically designed to be easily seen and pulled in an emergency. The fire escape parachute device 100 provides a quick and controlled descent to users, thereby providing a safe means of escaping from high-rise buildings during emergencies.

Figure 4:
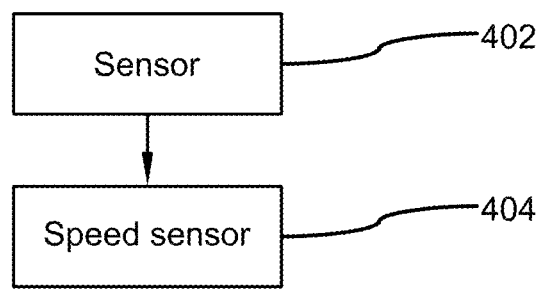
FIG. 4 illustrates a block diagram depicting two sensors included in one embodiment of the fire escape parachute device of the present invention for high-rise emergency evacuations in accordance with the disclosed structure.

FIG. 4 illustrates a block diagram depicting two sensors included in one embodiment of the fire escape parachute device of the present invention for high-rise emergency evacuations in accordance with the disclosed structure. In the present embodiment, the parachute device 100 can include a sensor 402 that monitors the user's altitude. The sensor 402 can be an active sensor or a passive sensor and is adapted to detect altitude from the ground level. A speed sensor 404 adjusts the canopy 102 based on the altitude detected by the sensor 402 and adjusts the speed of descent of the user.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "fire escape parachute device", "fire escape parachute device for high-rise emergency evacuations", "advanced fire-resistant parachute system for safe evacuation", and "parachute device" are interchangeable and refer to the fire escape parachute device for high-rise emergency evacuations 100 of the present invention.

Notwithstanding the forgoing, the fire escape parachute device for high-rise emergency evacuations 100 of the present invention can be of any suitable size and configuration as is known in the art without affecting the overall concept of the invention, provided that it accomplishes the above stated objectives. One of ordinary skill in the art will appreciate that the fire escape parachute device for high-rise emergency evacuations 100 as shown in the FIGS. are for illustrative purposes only, and that many other sizes and shapes of the fire escape parachute device for high-rise emergency evacuations 100 are well within the scope of the present disclosure. Although the dimensions of the fire escape parachute device for high-rise emergency evacuations 100 are important design parameters for user convenience, the fire escape parachute device for high-rise emergency evacuations 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A quick deployment emergency parachute device comprising:
a canopy;
a plurality of shroud lines;
a deployment handle;
a harness; and
a plurality of suspension lines;
wherein said canopy having a material selected from the group consisting of a ripstop nylon;
wherein said plurality of shroud lines support said canopy;
wherein said deployment handle deploys said canopy;
wherein said harness secured to said canopy with said plurality of suspension lines;
wherein said harness is securable to a user of the parachute device;
wherein said canopy in a deployed orientation having a diameter from 6 feet to 18 feet;
wherein each shroud line is a multi-strand Kevlar thread configured to reinforce the canopy;
wherein a bottom end of each said plurality of suspension lines is detachably fastened to said harness; and
further wherein the harness is a polyester harness.

2. The quick deployment emergency parachute device of claim 1, wherein said canopy in the deployed orientation having a diameter from 9 feet to 15 feet.

3. The quick deployment emergency parachute device of claim 1, wherein said harness having a pair of shoulder straps, a pair of thigh straps, and a chest support member.

4. The quick deployment emergency parachute device of claim 3, wherein said canopy is waterproof.

5. The quick deployment emergency parachute device of claim 4, wherein said canopy is fire-resistant.

6. The quick deployment emergency parachute device of claim 3, wherein said harness having a buckle at a front side of said harness for securing said harness around a body of the user of said parachute device.

7. The quick deployment emergency parachute device of claim 6, wherein a top end of each said plurality of suspension lines is connected to one of said plurality of shroud lines.

8. The quick deployment emergency parachute device of claim 1, wherein said harness having a fire-resistant padding including a covering of Nomex fabric.

9. A quick deployment emergency parachute device comprising:
a canopy;
a plurality of shroud lines;
a deployment handle;
a harness; and
a plurality of suspension lines;
wherein said canopy having a material selected from the group consisting of a ripstop nylon;
wherein said plurality of shroud lines support said canopy;
wherein said deployment handle deploys said canopy;
wherein said harness secured to said canopy with said plurality of suspension lines;
wherein said harness is securable to a user of the parachute device;
wherein said canopy in a deployed orientation having a diameter from 6 feet to 18 feet;
wherein a top end of each said plurality of suspension lines is connected to said plurality of shroud lines; and
wherein a bottom end of each said plurality of suspension lines detachably fastened to said harness;
wherein each shroud line is a multi-strand Kevlar thread configured to reinforce the canopy;
wherein a bottom end of each said plurality of suspension lines is detachably fastened to said harness; and
further wherein the harness is a Kevlar harness.

10. The quick deployment emergency parachute device of claim 9, wherein said canopy in the deployed orientation having a diameter from 9 feet to 15 feet.

11. The quick deployment emergency parachute device of claim 9, wherein said harness having a pair of shoulder straps, a pair of thigh straps, and a chest support member.

12. The quick deployment emergency parachute device of claim 11, wherein said canopy is fire-resistant.

13. The quick deployment emergency parachute device of claim 9, wherein said harness having a fire-resistant padding including a covering of Nomex fabric.

14. A method of using a quick deployment emergency parachute device, the method comprising the steps of:
providing a canopy, a plurality of shroud lines, a deployment handle, a harness, and a plurality of suspension lines, wherein said plurality of shroud lines support said canopy;
further wherein said deployment handle deploys said canopy;
securing said harness to said canopy with said plurality of suspension lines;
securing said harness to a user of the parachute device;
jumping from a fixed base with the parachute device;
pulling said deployment handle; and
deploying said canopy, wherein said canopy in a deployed orientation having a diameter from 6 feet to 18 feet;
wherein each shroud line is a multi-strand Kevlar thread configured to reinforce the canopy;
wherein a bottom end of each said plurality of suspension lines is detachably fastened to said harness; and
wherein the harness is a Kevlar harness.

15. The quick deployment emergency parachute device of claim 14, wherein said harness having a pair of shoulder straps, a pair of thigh straps, and a chest support member.

* * * * *